Patented Sept. 28, 1954

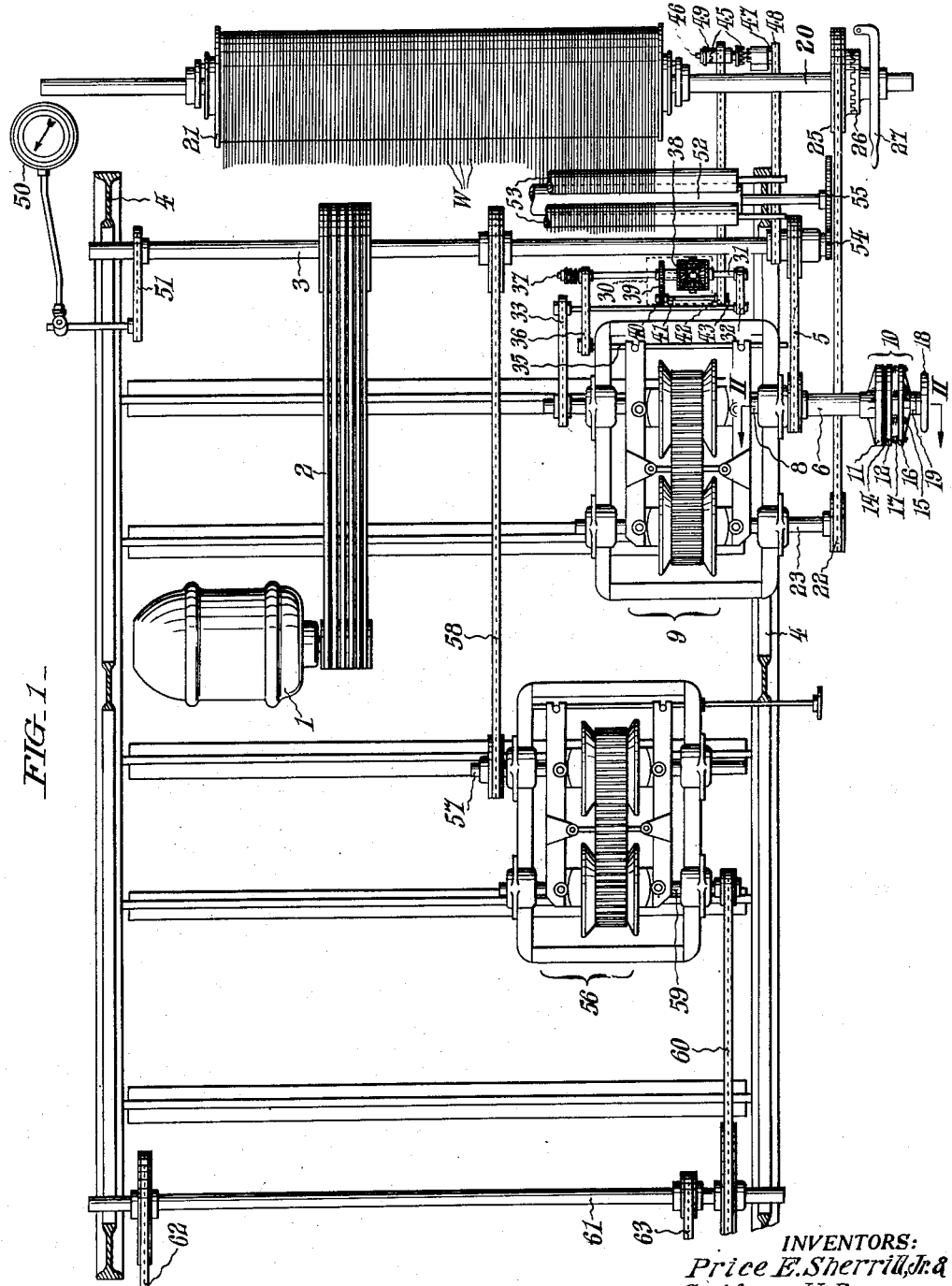

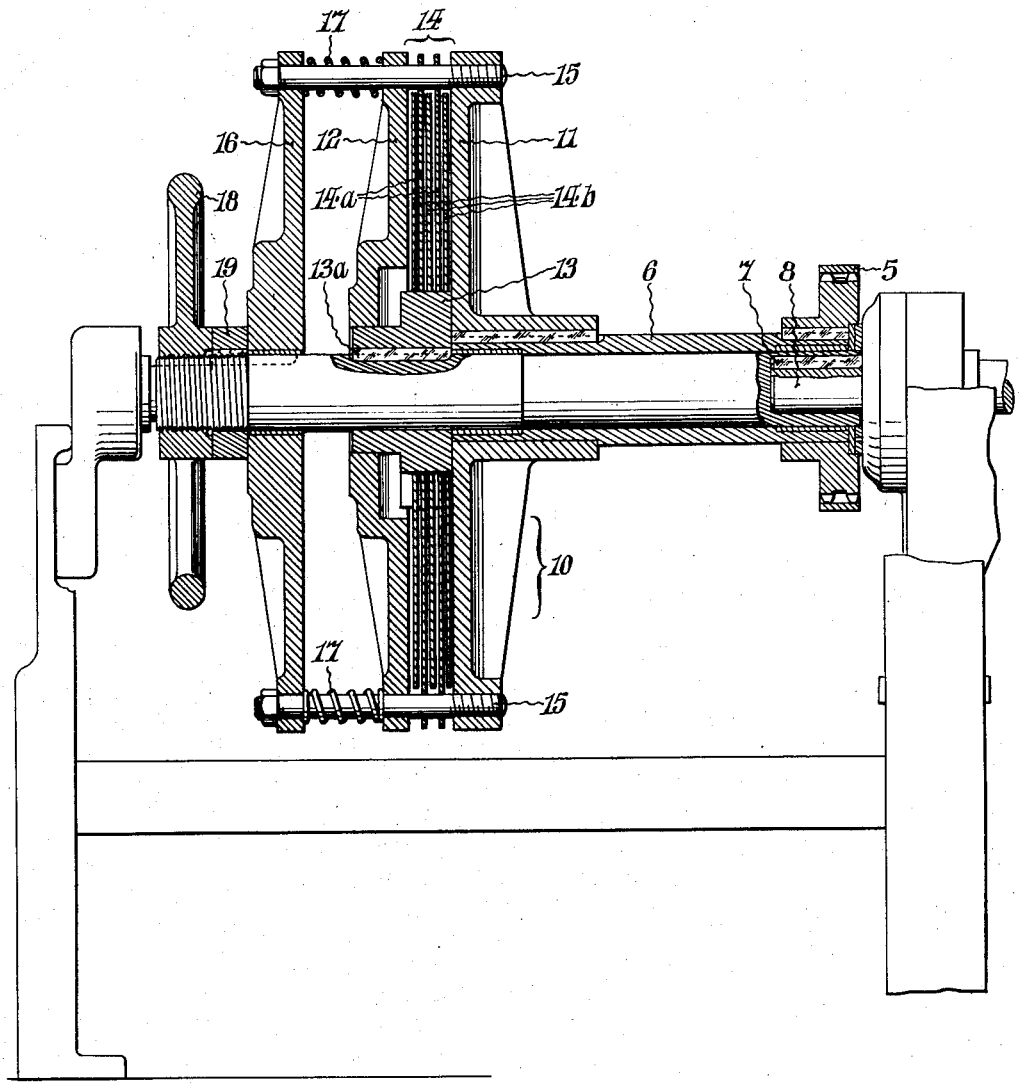

2,690,243

UNITED STATES PATENT OFFICE 2,690,243

DRIVING MECHANISM FOR TEXTILE MACHINES

Price E. Sherill, Jr., and Godfrey H. Browne, Gastonia, N. C., assignors to Cocker Machine & Foundry Company, Gastonia, N. C., a corporation of North Carolina Application January 3, 1951, Serial No. 204,116

2 Claims. (Cl. 192—3.5)

This invention relates to driving mechanism for textile machines, such as slashers or warpers, the same being an improvement upon a generally similar construction disclosed in U. S. Patent No. 2,142,544, granted to Ernest K. Whitmer and Thomas F. Suggs on January 3, 1939.

In the patented construction, the input shaft of a variable speed device is positively driven through a sprocket chain from a shaft which rotates at a constant speed, while the output shaft of said device is connected by a sprocket chain to a friction plate slip clutch on the shaft of the warp collecting beam. A compensating means in the form of a differential gear unit is provided to regulate the variable speed device and thereby intended to cause the speed of the beam to be decreased compensatively with the gradual increase of the diameter of the yarn accumulation on the beam. However, with the clutch arranged as in the patented structure, uniform tension did not obtain, and, for correction, it was necessary to adjust the clutch manually from time to time during the operation of the machine to keep the tension of the warps uniform.

The chief aim of our invention is to overcome the above pointed out drawbacks. This objective is realized in practice, as hereinafter more fully set forth, by a changed arrangement in which the input shaft of the variable speed device is driven, with interposition of the friction clutch, from an electric motor powered shaft, and in which said device can be definitely relied upon to automatically control the differential gear unit in its influence upon the variable speed device, in such manner that the rotation of the beam is gradually reduced compensatively as the warps accumulate thereon and the tension on the warps is maintained uniform throughout the processing, even if the motor should fluctuate in speed as frequently occurs.

Other objects and attendant advantages will appear from the following detailed description of the attached drawings wherein: Fig. 1 is a fragmentary, more or less diagrammatic view in top plan of a slasher with drive mechanism conveniently embodying our invention; and Fig. 2 is a fragmentary view in section, drawn to a larger scale and taken as indicated by the angled arrows in Fig. 1.

With more specific reference to these illustrations, 1 designates a reversible electric motor which, through belting 2, constantly drives a transverse jack shaft 3 suitably journalled in the side frames 4 of the slasher. In accordance with our invention, rotary motion is constantly communicated from the shaft 3 by means of a sprocket chain 5, to a sleeve 6 free on a keyed extension 7 of the input shaft 8 of a variable speed device 9. A friction clutch 10 connects the sleeve 6 to the extension 7 of the input shaft 8 of the device 9. As shown, the clutch 10 is of a well known type comprising a head plate 11 which is keyed to the sleeve 6, a mating head plate 12 which is axially slidable on the reduced end of a collar 13 keyed to the shaft, and a plurality of interposed friction disks 14 which surround the main or large diameter portion of said collar. The alternate disks 14a of the group 14 are held against independent rotation relative to the plates 11 and 12 by virtue of passage through them, adjacent their peripheries, of guide studs 15 which are anchored in, and which project laterally from the plate 11. The intermediate disks 14b of the group 14 are held against independent rotation relative to the collar 13 through engagement of key lugs thereon with a slot 13a in said collar. In compression between the plate 12 and a backing plate 16, and surrounding the studs 15, are helical springs 17 whereby the plate 12 is yieldingly urged toward the plate 11 to maintain the disks 14 in yielding functional contact with each other and with said plates. The force of the springs 17 is adjustable by means of a hand wheel 18 which is threadedly engaged with the shaft to shift the backing plate 16 axially, a key-connected slide collar 19 on said shaft being interposed between said wheel and said plate. For convenience, the sleeve 6, the heads 11, 12, 16 and the plates 14a may be referred to as constituting the "constant" side of the clutch, and the collar 13 and the disks 14b as the "slip" side of said clutch.

The shaft 20 of the beam 21 (Fig. 1) upon which the warps W are collected, is connected through a chain 22 to the output shaft 23 of the unit 9; the sprocket wheel 25, for this chain, being connected to the beam shaft 20 by a toothed clutch 26 which is releasable by means of the hand lever indicated at 27.

The means for governing the functioning of the variable speed device 9 includes a differential gear unit 30 whereof one side, i. e., the shaft 31, is driven through sprocket chains 32 and 33 from the input shaft 8 of said device while the regulating shaft 35 of said device is actuated by a sprocket chain 36 from the other side, i. e. the shaft 37 of said differential gear unit. Rotatively free on the shaft 37 and secured to the bevel pinion 38 of the differential gear unit 30 is a spur wheel 39 which meshes with a mating spur wheel 40 on a countershaft 41. By means of a chain 42, a sprocket pinion 43 affixed to the shaft 41 is connected to a sprocket pinion 45 on a sleeve free on still another transverse shaft 46 which is rotatively supported in a fixed bearing 47 and which is driven through a chain 48 from the powered jack shaft 3. As shown, the sleeve of sprocket pinion 45 is provided at opposite ends with teeth for selective clutching engagement respectively with the corresponding teeth of collar 49 on shaft 46, or with corresponding teeth on the fixed bearing 47. The purpose of the arrangement will be presently disclosed. The speed indicator shown at 50 in Fig. 1 is driven through a chain connection 51 from jack shaft 3.

The main roll 52 of the group 53, by which the warps W are callendered en route to the beam 21, is positively driven from the jack shaft 3 by means of the intermeshing spur gears indicated at 54, 55. Here as in Patent 2,142,544, hereinbefore referred to, a second variable speed device 56 is embodied in the slasher, the input shaft 57 of said device being driven, through a sprocket chain 58, from the jack shaft 3, and the output shaft 59 connected by a sprocket chain 60 to a transverse shaft 61 which, through other sprocket chains 62 and 63, drives other parts (not shown) of the machine.

*Operation*

As the diameter of the warp accumulation on the beam 21 increases during operation of the slasher, the ratio between the power shafts of the differential unit 30 will gradually change and cause counter-clockwise rotation of the shaft 37 of said unit, with attendant adjustment, through the chain 36, of the regulating shaft 35 of the variable speed device 9. As a consequence, the speed of the output shaft 23 of the device 9 will be progressively decreased as will also that of the beam 21 by reason of the chain connection 22 between said shaft and said beam. This action is occasioned through slippage of the clutch 10 when there is a tendency of the warps to accelerate in linear speed due to the diametral growth of the warp accumulation on the beam. In this way, therefore, the rotative speed of the beam is accurately coordinated with the build up of the winding, so that a uniform tension is maintained on the warps throughout the processing period, with pre-assurance of an even density of the latter and attainment of perfect cloth subsequently woven from the warps.

If desired or deemed necessary during the operation of the slasher, the differential unit 30 may be re-set simply by temporarily unclutching the sprocket pinion 45 from the collar 49 on shaft 46 and clutching it to the stationary bearing 47. Under these conditions the bevel gear pinion 38 of the differential unit 30 will be held from rotating, and the regulating shaft 35 of the variable speed device 9 reversely rotated through induced movement of shaft 37 of said unit. The same procedure is resorted to in re-setting the variable speed device 30 after each run of the slasher.

Having thus described our invention, we claim:

1. A multiple disk slip clutch for use in the control of a textile machine having a yarn collecting beam, a motor-driven variable speed transmission device with an input shaft and an output shaft, a gear connection between the shaft of the beam and the output shaft of the variable speed device, and a sleeve rotatively free on a projecting end of the input shaft of the variable speed device and geared to the motor, said clutch having alternate disks restrained against rotation relative to the sleeve and intermediate disks restrained against rotation relative to the input shaft, a pair of head plates respectively on opposite sides of the disk group, one fixed on the sleeve and the other axially free upon the input shaft of the variable speed device, a backing plate also freely mounted on said input shaft in spaced relation to the backing plate, a series of annularly arranged studs connecting the backing plate with the head plate on the sleeve and passing through clearance apertures in the axially free head plate, helical compression springs surrounding the studs in the interval between the axially free head plate and the backing plate, a hand wheel threadedly engaged upon the input shaft for axially shifting the backing plate to regulate the pressure exerted by the springs, and means for securing the hand wheel against accidental displacement in adjusted positions.

2. A multiple disk slip clutch for use in the control of a textile machine having a yarn collecting beam, a motor-driven variable speed transmission device with an input shaft and an output shaft, a gear connection between the shaft of the beam and the output shaft of the variable speed device, and a sleeve rotatively free on a projecting end of the input shaft of the variable speed device and geared to the motor; said clutch having alternate disks restrained against rotation relative to the sleeve and intermediate disks restrained against rotation relative to the input shaft, a pair of head plates respectively on opposite sides of the disk group, one fixed on the sleeve and the other axially free upon the input shaft of the variable speed device, a backing plate also freely mounted on said input shaft in spaced relation to the backing plate, compression spring means interposed between the axially-free head plate and the backing plate, and an adjusting element threadedly engaged upon the input shaft for axially shifting the backing plate to regulate the pressure exerted by the spring means.

References Cited in the file of this patent

UNITED STATES PATENTS

| Number | Name | Date |
|---|---|---|
| 2,142,544 | Whitener et al. | Jan. 3, 1939 |
| 2,162,962 | Messer | June 20, 1939 |
| 2,195,398 | Duda | Apr. 2, 1940 |
| 2,306,730 | Holmes | Dec. 29, 1942 |

OTHER REFERENCES

"Speed Gab" for January–February 1936. Published by Reeves Pulley Co., Columbus, Ohio. Drawings Nos. 26,856, 26,857, 26,885, and pages 5 to 7.